Patented May 17, 1932

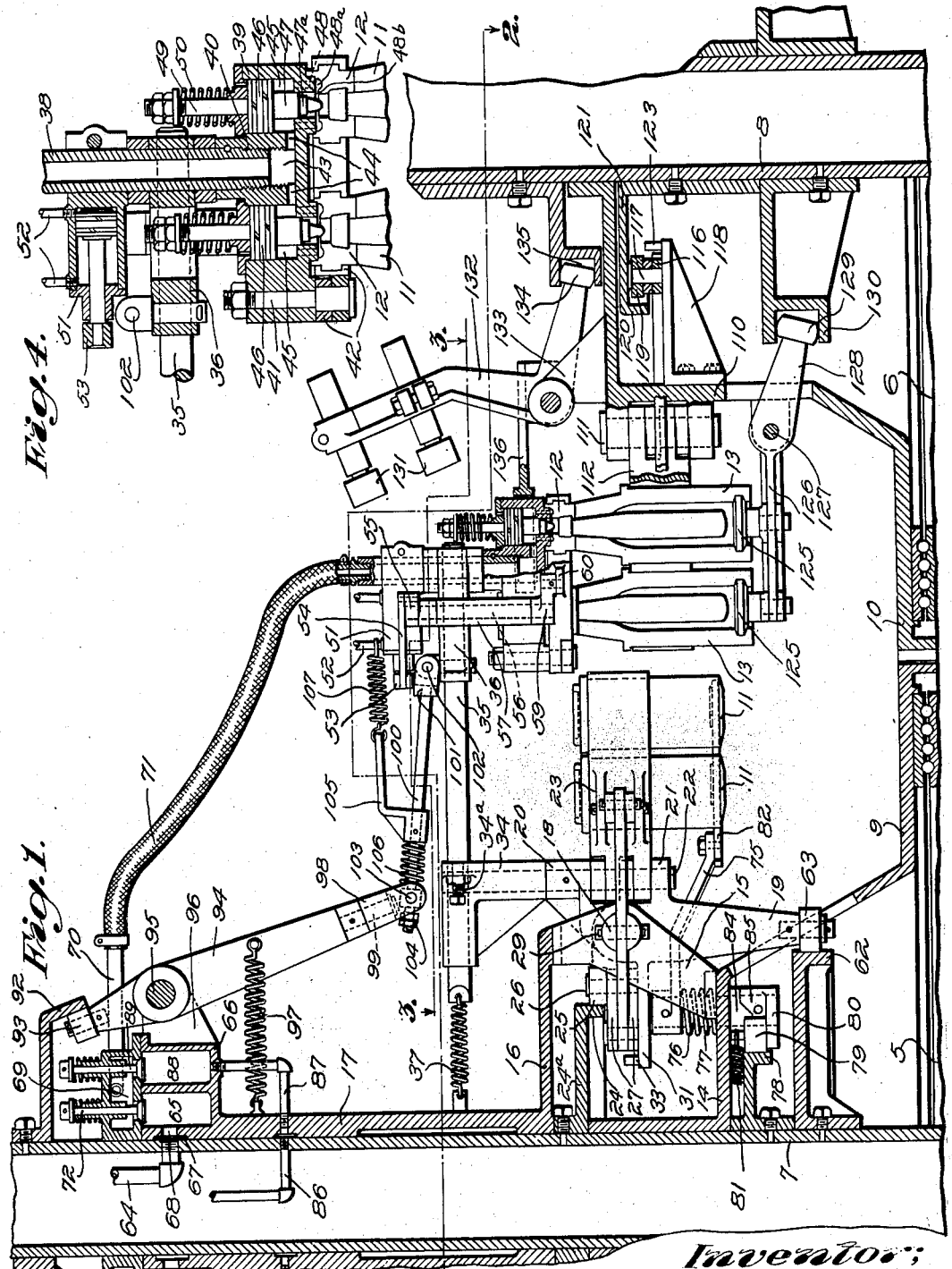

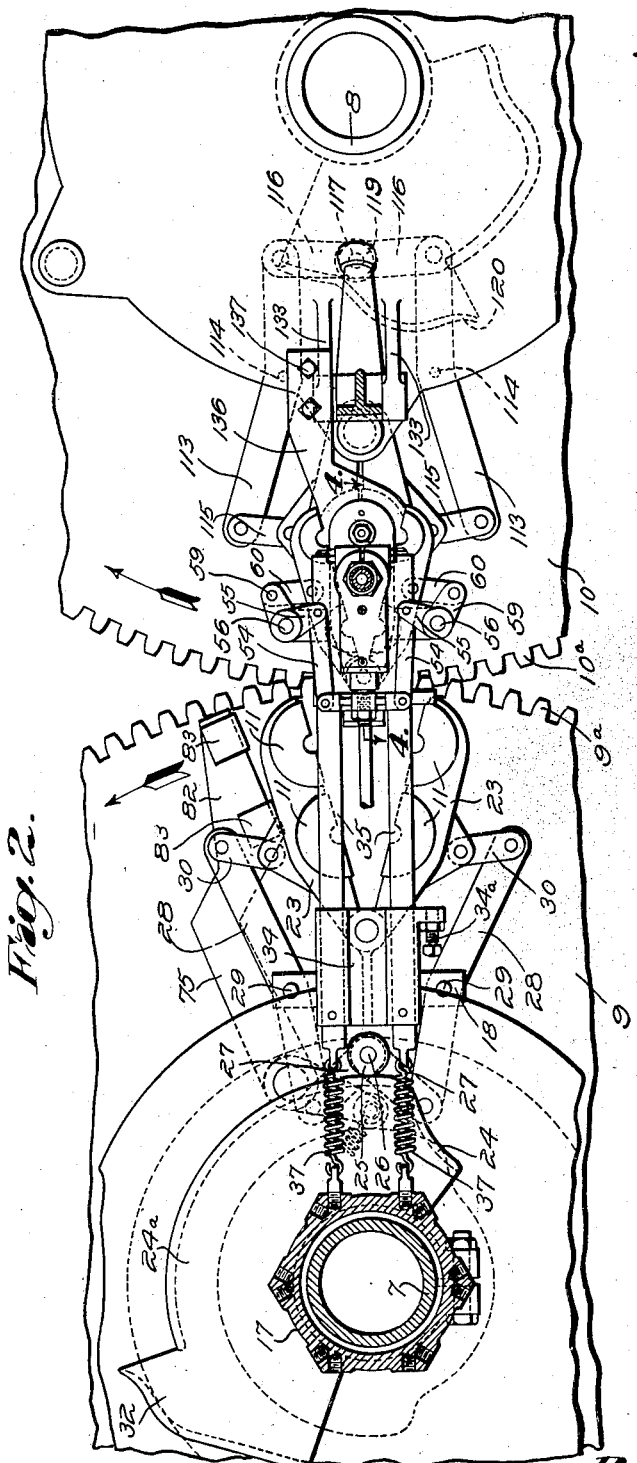

1,859,234

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

CONTINUOUS TWO-TABLE GLASSWARE FORMING MACHINE

Application filed January 9, 1930. Serial No. 419,513.

This invention relates to two-table glassware forming machines, and particularly to continuously operating machines provided with plural parison molds and plural finishing molds, and having transfer mechanism for simultaneously transferring parisons from the plural parison molds on one table to the companion plural finishing molds on the other table, while the tables are rotating.

In a continuous two-table forming machine having single parison and finishing molds, the transfer of a parison from a parison mold to the companion finishing mold, may be accomplished by transfer mechanism which operates to move the parison radially outwardly of the parison mold table into vertical alignment with the appropriate previously opened finishing mold, and to cause coincident travel of the parison with the finishing mold while the mold is closed about the parison. The transfer of parisons is effected in this manner in the machine illustrated in my copending application, Ser. No. 351,426, filed March 30, 1929, wherein novel individual tongs transfer mechanisms associated respectively with the finishing molds on the finishing mold table, operate to transfer the parisons as above stated, while the mold tables are continuously rotating.

In the simultaneous transfer of a plurality of parisons, from plural parison molds to plural finishing molds in a machine of the above character, it not only is necessary to provide for vertical alignment and coincident travel of the parisons and the plural finishing molds while the molds are closed about the parisons, but it also is necessary to provide for radial alignment of the parisons as a unit with the molds. This also is the case in transferring one or more parisons for panel bottles or other non-circular ware parisons. In my copending application, Ser. No. 371,137, filed June 15, 1929, which is a continuation in part of the aforesaid application, a novel method of transferring parisons is disclosed for the practice of which novel tongs transfer mechanisms are provided individual to the several plural finishing molds. The said tongs transfer mechanisms operate to rotate a plurality of parisons as a unit about a vertical axis, during the simultaneous transfer thereof, to align the parisons radially with respect to the appropriate plural finishing molds, and also to move the parisons into vertical alignment with the molds so that the molds may close about them.

This application is a continuation in part of the last-mentioned application, and is directed to a novel continuous two-table forming machine which, while employing certain of the broad principles and methods disclosed and claimed in the aforesaid applications differs therefrom in that the use of transfer tongs is eliminated.

It is an object of this invention to provide a novel continuous two-table forming machine wherein a plurality of parisons simultaneously are transferred from plural parison molds of a parison forming unit on the parison mold table, to the companion plural finishing molds on the finishing mold table, by means of plural neck molds associated with the parison molds. To this end, the plural neck molds may be mounted for movement radially of the parison mold table, and also for rotary movement as a unit about a vertical axis, thereby enabling the neck molds to carry a plurality of parisons into both vertical and radial alignment with the finishing molds, and to maintain the parisons in alignment with the finishing molds while the molds are closed about the parisons and during the rotation of the mold tables.

Another object of this invention is to provide a novel continuous two-table forming machine wherein a plurality of parisons are transferred from the plural parison molds on one table, to the companion plural finishing molds on the other table, by means of plural neck molds, and including means of novel construction for supporting the neck molds as a unit, for causing radial movements of the neck molds with respect to the parison mold table, and oscillation or rotary movement of the neck molds as a unit about a vertical axis, for transferring one or more parisons while the mold tables continuously are rotated.

A further object of this invention is to provide a novel continuous two-table forming machine having plural parison molds and plural finishing molds, and plural neck molds associated with the parison molds, and characterized by the provision of means for causing movement of the neck molds as a unit about a vertical axis to align a plurality of parisons carried thereby with the appropriate plural finishing molds, and for holding the parisons in alignment with the mold while the finishing molds are closed about the parisons. The means for holding the neck molds and parisons in alignment with the finishing molds may be carried by the finishing mold table for positively insuring vertical and radial alignment of the parisons with the molds during the transfer operation.

It also is an object of this invention to provide a novel continuous two-table forming machine having double or plural parison molds, and double or plural companion finishing molds mounted respectively on the two tables, plural neck molds being associated with the parison molds, and the parison and neck molds being arranged for dipping movement into a pool of molten glass, to charge the parison and neck molds by suction. After the charges of glass have been formed into parisons, the parisons simultaneously are transferred by the neck molds, the mechanism associated with the neck molds serving to carry the parisons into radial and vertical alignment with the previously opened finishing molds and to maintain the parisons in alignment with the finishing molds, while the finishing molds moving in circular paths, are closed about the parisons.

Other objects and advantages of the invention will be pointed out in the detailed description thereof which follows, or will become apparent from such a description.

Inasmuch as the problem of transferring one or more parisons for panel bottles or other non-circular parisons is similar to the problem of simultaneously transferring a plurality of ordinary parisons, as stated above, the transfer of such single or plural parisons comes within the purview of the above objects and other objects of the invention, and it is to be expressly understood that the invention is described and illustrated as being employed for transferring a plurality of ordinary parisons, only by way of example, and for the sake of convenient illustration.

In order that the invention may more readily be understood, and its manifold advantages appreciated, reference should be had to the accompanying drawings, in which one embodiment of the invention is illustrated.

In said drawings:

Figure 1 is a view partly in vertical longitudinal section and partly in elevation of portions of a continuous two-table forming machine embodying the invention;

Fig. 2 is a view partly in horizontal section, but principally in top plan, of the construction shown in Fig. 1, said view being taken on the line 2—2 of Fig. 1;

Fig. 3 is an enlarged view partly in horizontal section, but principally in top plan, illustrating the novel transfer mechanism of the invention, said view being taken on the line 3—3 of Fig. 1; and Fig. 4 is an enlarged view in vertical longitudinal section taken on the line 4—4 of Fig. 2, and showing in detail the construction of the suction and blowhead structure and associated mechanism.

In general, apparatus embodying the invention includes a parison mold table upon which a plurality of parison forming units are mounted, and a finishing mold table which carries a plurality of finishing mold units. Each parison mold unit includes a plurality of parison molds, a plurality of neck molds associated with the parison molds, and appropriate means for applying vacuum and pressure to the neck molds and parison molds. Likewise, each finishing mold unit includes a plurality of finishing molds, and also may have associated therewith plural blowheads and bottom plates.

Mechanisms are provided for opening and closing the molds of the machine, at appropriate times, and each of the plural neck molds is provided with means for radially projecting the neck molds as a unit, and for rotating them as a unit about a vertical axis for transferring the parisons. Inasmuch as the parison forming units and the finishing mold units may be identical in construction, only one of each of said units is illustrated in the drawings and will be described hereinafter.

The parison forming unit preferably is charged with glass by the suction method and to this end is mounted for dipping movement into and out of a pool of glass (not shown), suitable vacuum connections being provided to apply vacuum to the molds, and shearing mechanism being provided to sever the tails of glass from the suction gathered charges. Means also may be provided in the parison forming unit whereby preliminary blowing air is applied to the charges in the parison forming unit, while the bottom thereof are supported by the shearing mechanism or other suitable bottom closures, to assist in shaping the charges into parisons.

The plural neck molds may be carried by a slide mounted for radial movement upon guides which, in turn, are supported for oscillatory or swinging movement about a vertical axis. The neck molds also are mounted for oscillation or rotary movement about a vertical axis in and relative to, the slide. By means of this construction, after the charges of glass have been shaped into parisons, mechanism connected to the neck mold slide may operate to project the neck molds radially outwardly of the table, after the parison molds have been opened, and a relatively stationary guide associated with the companion plural finishing molds may then receive suction and blowhead structure for rotating the neck mold and parisons as a unit about a vertical axis into alignment with the previously opened finishing molds, and for holding them in such alignment during coincident travel thereof. While so held, the finishing molds close about the parisons, after which the neck molds are opened releasing the parisons in the finishing mold, the neck mold slide is retracted, disengaging the suction and blowhead structure and the stationary guide, and returning the neck molds into alignment with the parison molds. Plural blowheads associated with the finishing molds now are moved into engagement with the tops of the molds and the parisons are blown to final shape.

Referring in detail to the drawings:

The bases or beds of the parison and finishing mold tables are indicated respectively at 5 and 6. Vertical columns 7 and 8 mounted respectively in the bases of 5 and 6 serve to support and guide the parison mold table 9 and the finishing mold table 10. The mold tables are provided with intermeshing gears 9a and 10a on the peripheries thereof, whereby the tables are rotated in unison in direction indicated for example by the arrows in Fig. 2. The tables may be continuously rotated by a suitably driven pinion (not shown) meshing with either one of the gears 9a, 10a. The parison mold table 9 carries the plural sectional parison molds 11, and the plural sectional neck molds 12, and the finishing mold table 10 carries the plural sectional finishing molds 13.

The construction of the parison forming unit and associated mechanism first will be considered. Extending upwardly from the horizontal portion 14 of the table 9 is a web or bracket 15, the top of which is connected with an annular horizontal plate 16 provided on the bottom of an upwardly extending sleeve 17, surrounding column 7.

Extending through the web 15 is a horizontal pivot pin 18 upon which a bell crank 19 rockingly is mounted. The upper and outer arm of the bell crank 19 is bifurcated to provide vertically spaced lugs 20 and 21 in which a vertical pivot pin 22 is secured.

Mounted upon the pivot pin 22 between the lugs 20 and 21 are the holders 23 which carry the pairs of sections of the parison molds 11.

The parison molds 11 are opened at appropriate times by means of a stationary cam 24 provided on a plate 24a secured to the column 7. The outer edge of cam 24 is engaged by a roller 25 mounted on a pivot pin 26, which pivot pin serves to connect the adjoining ends of a pair of links 27, see Fig. 2. The inner ends of the links 27, in turn, are pivotally connected to the inner ends of bent levers 28 pivoted at 29 in the laterally projecting end portions of the horizontal pivot 18. The links 27 provide a toggle joint between levers 28. The outer ends of the levers 28 are connected by links 30 to the mold holders 23. The links 27 are slidably supported for horizontal movements by a rearwardly extending bracket 31 formed on the bell crank 19, Fig. 1.

The cam 24 causes the roller 25 to be moved outwardly radially of the table at the proper time whereupon links 27, sliding upon the bracket 31, draw together the inner ends of levers 28, thereby opening the parison molds 11. To close the parison molds inward radial movement of the roller 25 is effected by means of a cam 32 provided on plate 24a, and which is engaged on its inner edge by the roller. The cam 32 moves roller 25 inwardly of the table until the links 27 just pass dead center positions, at which time the links strike a stop 33 on the bracket 31. Thus, links 27 serve to lock the parison molds closed until the roller 25 again is moved outwardly by cam 24, as previously explained.

The neck molds 12 and associated mechanisms are mounted upon a carrier which includes a supporting member 34, loosely mounted on the upper portion of pivot pin 22, as shown. The member 34 rests upon lug 20, and has horizontal parallel openings formed therein to receive a pair of horizontal parallel guide rods 35, which carry a neck mold slide 36. The member 34 and the mechanism carried thereby, yieldingly are held against rocking movement about pivot pin 22 by means of tension springs 37 connected at their outer ends to the inner ends of rods 35, and at their inner ends to the sleeve 17, as shown for example in Fig. 2. The springs 37 yieldingly hold the carrier in radial alignment with the parison molds 11.

When the neck mold slide 36 is in inwardly retracted position, it abuts either the outer face of member 34 or the outer end of a set screw 37a mounted in a lug provided on said member. The screw 34a may be adjusted, if necessary, to vary the innermost position of the slide and to secure alignment of the neck molds, carried by the slide, with the parison molds.

Suitably journaled in the slide 36 is a tubular member 38, the bottom end of which is screw threaded into the suction and blowhead structure 39, as indicated at 40, Fig. 4. Mounted in the rear portion of the head 39 is a hinge pin 41 upon which the holders 42 for the pairs of sections of the neck molds 12, rockingly are mounted.

The tubular member 38, which constitutes a vacuum and air pipe, as hereinafter explained, communicates with a central passage 43 in the head 39, and is connected through lateral ducts 44 with chambers 45. Mounted in the chambers 45 are pistons 46, each of which carries a plunger or neck pin 47, having a reduced lower end portion 47a and a tip of appropriate shape. Plungers 47 extend downwardly through openings in the bottom of head 39 into the openings in the neck molds. Communication is provided between chambers 45 and the neck mold cavities by vertical ducts 48, the lower ends of which open into annular grooves 48a formed in the tops of the neck molds. The inner top edges of the neck molds are cut away, as shown in Fig. 4, to provide passageways between grooves 48a and the mold cavities. These passageways are restricted by portions 47a of the plungers when moved downwardly, as explained hereinafter.

The pistons 46 have upwardly extending rods 49 connected thereto, which are encircled by compression springs 50, engaging collars on the upper ends of the rods, and resting upon the top of the head 39, whereby the pistons and plungers yieldingly are held in raised positions.

The neck molds are opened and closed by an air motor 51 clamped to the upper portion of the tube 38. The air motor 51 is provided with conduits 52 through which air pressure alternately is admitted and relieved from the opposite ends of the air motor to open or close the neck molds. The flow of air through conduits 52 may be controlled by valves (not shown) timed to operate in synchronism with the other parts of the machine. Connected to the air motor 51 is a cross head 53 joined by links 54 to crank arms 55 on the upper end of crank shafts 56. The shafts 56 are mounted in vertical sleeves 57 carried by arms 58 projecting laterally from the head 39, see Fig. 3. Mounted on the bottom ends of the shafts 56 are crank arms 59. The crank arms 59 are pivotally connected by links 60, to the holders 42, for the pairs of neck mold sections. By means of these connections, air motor 51 operates to open or close the neck molds.

It will be seen that the parison molds, the neck molds, and the suction and blowhead structure, together with associated operating mechanisms, all are mounted on bell crank 19 for pivotal movement about the axis of the pivot pin 18. This permits the parison forming unit to be dipped into and out of a gathering pool, not shown. The dipping movement of the parison forming unit is controlled by means of a cam 62 secured to the column 7. The cam 62 is engaged by a roller 63 mounted on the downwardly extending arm of the bell crank 19. The cam 62 serves to rock the parison forming unit upwardly to clear the glass container walls, then downwardly to dip the parison molds into the glass at the level indicated, then upwardly to clear the other wall and downwardly again to the position shown in Fig. 1. When the parison molds 11 are dipped into the glass, vacuum is applied to the neck mold and the parison mold as follows:

A vacuum conduit 64 which leads from a suitable source of vacuum, not shown, is mounted in the column 7, and communicates with a vacuum chamber 65 in a valve casing 66. The valve casing 66 is carried on the upper end of sleeve 17, previously referred to, and constant communication between conduit 64 and chamber 65 is provided by means of a continuous annular groove 67 formed on the interior of the sleeve 17, and a lateral port 68 formed in said sleeve, and leading into chamber 65. Also formed in the casing 66 is an upper chamber 69, to which a conduit 70 is connected. The conduit 70 leads to the tubular member 38, previously referred to, through a flexible conduit 71.

Communication between chamber 65 and chamber 69 is effected at appropriate times to apply vacuum through conduits 70, 71 and tubular member 38 to the head 39, by a means of a spring-pressed, downwardly opening valve 72. The valve 72 is opened by means of a cam 73 provided on the under side of a plate 74 secured to the column 7 of the parison mold table. The top of valve 72 slidably engages cam 73 and is opened downwardly thereby and held open for the required period, after which the valve is disengaged from the cam and permitted to close.

After the parison molds 11 have been dipped into the glass by the operation of cam 62, the vacuum applied to the neck molds and parison molds by valve 72, the parison forming unit is raised and the tails of glass depending from the charges are severed by means of shearing mechanism. The shearing mechanism comprises an arm 75 secured to the top of a vertical rock shaft 76 loosely mounted in the horizontal portion 14 of the parison mold table, and yieldingly held in raised position by means of a compression spring 77. The arm 75 is oscillated by means of a cam 78 secured to the column 7, and engaged by a roller 79, carried by a crank arm 80, secured to the bottom end of rock shaft 76. The roller 79 yieldingly is held in engagement with cam 78 by means of a tension spring 81.

The arm 75 extends outwardly and downwardly and supports a horizontal member 82 which carries a pair of shear blades 83.

The shear blades 83 are mounted on the member 82 in spaced relation for cooperation with the bottoms of the parison molds 11.

The cam 78 serves to impart both swinging and vertical movement to the shear blade as a result of the rotation of the rock shaft 76 thereby, and such vertical movement is effected by means of a stationary annular cam 84 encircling the rock shaft 76 and secured to the under side of the table 14. The cam 84 is engaged by a similar cam 85 formed on the hub of crank arm 80, as shown in Fig. 1. Thus, the shear blades are moved downwardly and across the bottoms of the parison molds in yielding sliding engagement therewith, to sever the tails of glass from the charges in the molds.

Preferably, the contour of cam 78 is such as to maintain the shear blades 83 in engagement with the bottoms of the parison molds 11, after the severing operation, to support the charges in the molds for preliminary blowing to assist in shaping the charges into parisons. Preliminary blowing air is supplied to the suction and blowhead 39 as follows:

A conduit 86 leading from a suitable source of pressure, not shown, and mounted in the column 7, leads through an annular groove on the inside of the sleeve 17, into a conduit 87 connected with a chamber 88 in valve casing 66. Chamber 88 in turn leads into the chamber 69, previously referred to, through a passage controlled by a valve 89, similar to valve 72, and opened and closed at appropriate times by means of a cam 90 provided on the under side of the cam plate 74. Thus, after valve 72 has been closed, valve 89 is opened to permit preliminary blowing air to flow from chamber 88 thence through chamber 69, conduits 70 and 71, and through the tubular member 38 into the head 39, and thence downwardly into the bubbles in the parisons, previously formed therein by plungers 47.

Considering now the mechanism for actuating the neck mold slide and neck molds to effect the transfer of parisons from the parison molds 11 to the finishing molds 13, and referring particularly to Fig. 1, it will be seen that the cam plate 74 is provided with a downwardly extending cam 92 on the edge thereof. The cam 92 serves to reciprocate the neck molds radially of the parison mold table, and is engaged by a roller 93 on the upper end of a lever 94. The lever 94 is pivoted at 95 on a bracket 96 extending outwardly from the valve casing 66. A tension spring 97 connected at its outer end to the lever 94 below the pivot 95, and at its inner end to the sleeve 17, serves yieldingly to hold the roller 93 in engagement with the cam 92 and to rock the bottom end of the lever inwardly of the mold table, to assist in retracting the slide 36.

The lever 94 universally is connected to the neck mold slide 36 by means of a clevis 98, mounted on a pivot stud 99 extending downwardly from the bottom end of the lever, and a rod 100 loosely connected to the clevis at its inner end, and joined to the neck mold slide 36 at its outer end by means of a clevis 101 pivoted on slide 36 as indicated at 102. The inner end portion of rod 100 extends loosely through a block 103 pivotally mounted in the clevis 99, and is provided with an adjustable stop nut 104 on its inner end for limiting outward movement of the rod 100 relative to the block 103, and to lever 94. Interposed between the block 103 and an arm 105 secured to the arm 100, which arm is provided for a purpose hereinafter explained, is a compression spring 106. Thus, a yielding lost motion connection is provided between the lever 94 and the slide 36 which permits horizontal movement of the neck mold slide 36 relative to the lever 94, and the connections between lever 94 and slide 36, also permit oscillation of the carrier without interfering with the operative connection between said lever and slide.

The arm 105 serves as a support for the inner end of a tension spring 107, the outer end of which is connected to the innermost conduit 52 of the air motor 51. The tension spring 107 serves yieldingly to maintain the head 39 and the neck molds 12 in radial alignment with the neck mold slide, and the operating mechanism therefor, and with the parison molds 11. In other words, the spring 107 tends to prevent rotation of the head 39 about a vertical axis relative to the slide 36.

We now come to consider the construction of the finishing molds and associated mechanisms. Mounted in lugs on the vertical portion 110 of the finishing mold table 10, is a vertical hinge pin 111 which carries the holders 112 for the pairs of sections of the finishing molds 13. The finishing molds are opened and closed by mechanism similar to that provided for opening and closing the parison molds, and including a pair of bent levers 113 pivotally mounted at 114 (Fig. 2) in the vertical portion 110 of the table. The levers 113 are connected at their outer ends to the holders 112 by means of links 115, and at their inner ends to links 116, the adjoining ends of which pivotally are connected together by a vertical pivot pin 117. The bottom link 116 slides upon a bracket 118 extending inwardly from the vertical portion 110 of the table.

Also mounted upon the vertical pivot pin 117 is a cam roller 119 adapted to engage the inner edge of a cam 120 provided on a stationary cam plate 121 secured to column 8, for closing the finishing molds, and to cooperate with a cam 122 provided on plate 121, to open the finishing molds.

As the finishing mold table rotates, the finishing molds are opened prior to the arrival thereof at the beginning of the transfer zone, as a result of the cooperation of roller 119 with the outer edge of cam 122 which causes the roller 119 to be moved outwardly of the table to rock the levers 113 in a direction to open the molds. Inward radial movement of the roller 119 effected by cam 120 to close the molds, is limited by a stop lug 123 on the bracket 118, said lug being positioned to arrest the inward movement of the roller 119 shortly after the links 116 have passed dead center positions, so that the toggle joint provided by said links, locks the molds closed.

The finishing molds 13 are recessed at their bottoms to permit them to be closed about bottom plates 125 shaped to fit in the said recesses. The bottom plates 125 are mounted in radially spaced relation upon a bell crank 126 pivotally supported on the table 10 for vertical movements, as indicated at 127. The inner arm 128 of the bell crank carries a cam roller 129 for engagement with a stationary cam 130 secured to the column 8 of the table. The cam 130 is shaped to raise the bottom plates into and out of position for cooperation with the finishing molds 13.

Blowing air may be supplied to the finishing molds by a pair of blowheads 131 suitably mounted in the outer arm of a bell crank 132. The bell crank 132 pivotally is mounted for vertical movements in a pair of brackets 133 provided on the top horizontal portion of the table 10. The inner arm of the bell crank 132 carries a roller 134 which engages a cam 135 secured to the column 8, for lowering and raising the blowheads into and out of engagement with the tops of the finishing molds. Blowing air may be supplied to the blowheads 131 from a suitable source, by means of flexible conduits, not shown, in known manner.

The finishing mold table carries means for maintaining the neck molds and parisons in radial alignment with the finishing mold during the transfer operation. Said means comprises a yoke 136 secured to one of the brackets 133, as indicated at 137, Fig. 3. The yoke 136 is shaped to receive the head 39 upon the radial outward projection of the slide 36 and the mechanism supported thereby. The yoke is so positioned that the center line of the opening therein, coincides with the centers of the finishing molds. Thus, when head 39 enters the yoke, the neck molds and parisons will be held in alignment with the finishing molds.

One preferred mode of operation of the apparatus embodying the invention is as follows:

The tables 9 and 10 are rotated continuously. The neck mold slide 36 being in inwardly retracted position, and the neck mold and parison molds being closed and in cooperative relation with each other, the parison forming unit is swung over a suitable gathering pool (not shown) as a unit, and is lowered by the cam 62 to dip the parison molds 11 into the glass. At the instant that the molds touch the glass, vacuum valve 72 is opened by cam 73 to apply vacuum to the tubular member 38, the head 39, and the neck molds and parison molds, thereby filling the molds with glass. When the vacuum first is applied, unrestricted application thereof through the passages 48b will be permitted because the pistons 46 and the plungers 47 are in their uppermost positions. This permits the parison molds quickly to be filled. But as the intensity of the vacuum increases due to the filling of the molds, the pistons 46 are drawn downwardly depressing the plungers 47, whereupon portions 47a of the plungers restrict the application of vacuum through the passages 48b. The lowering of the pistons 46 also moves the tips of the plungers into the neck molds for assisting in the shaping of the neck finish portions of the parisons.

Upon completion of the gathering operation, the parison forming unit is raised by the cam 62 to remove the molds 11 from the glass, whereupon the shearing mechanism is swung downwardly by a cam 78 and cams 84 and 85, and the shear blades 83 sever the tails of glass depending from the charges in the molds. After the molds have cleared the further edge of the gathering pool, they are again brought to vertical position.

After the shear blades 83 are moved into engagement with the bottom of the molds and sever the glass, the valve 72 is closed, and the valve 89 is opened to apply preliminary blowing pressure to the molds to assist in shaping the charges supported by the blades into parisons. The termination of the application of vacuum, and the admission of preliminary blowing air into the head 39, together with the action of springs 50, causes the pistons 46 and the plungers 47 to be raised into the positions in which they are shown in Fig. 4. This permits unrestricted application of preliminary blowing air to the charges of glass in the molds.

As the mold tables continue to rotate, the parison forming unit, and the finishing molds are moved toward a transfer zone or toward the positions in which the parts of the machine are shown in Fig. 3. During such movement, the parison molds are opened by cam 24 leaving the parisons suspended from the neck molds, and the finishing molds 13 are opened by cam 122 to permit the removal of previously completed articles.

At the appropriate time, lever 94 is rocked about its pivot by cam 92 to move the neck mold slide 36 radially outwardly on the guide 35. The outward projection of the neck mold slide 36 and the rotation of the mold table causes the suction head 39 to move into engagement with the stationary yoke 136, as the parisons suspended from the neck mold are carried in between the sections of the previously opened finishing molds.

As a result of the engagement of the head 39 with the yoke 136, the carrier including the supporting member 34 and the rod 35, together with the mechanism supported thereby, are swung horizontally as a whole about the axis of pin 22 in a counterclockwise direction, and also the head 39 and the neck molds and parisons are rotated as a unit about the axis of tubular member 138 relative to slide 36, thereby radially aligning the parisons with the finishing mold.

Upon further rotation of the mold tables and additional radial projection of the neck mold slide 36, the head 39 is moved tightly into engagement with the yoke 136, as shown in Fig. 3, vertically aligning the parisons with the finishing molds. The head yieldingly is held in engagement with the yoke 136 by the spring 106 acting on rod 100. The bottom plates now are raised into horizontal position, and closing movement of the finishing mold is initiated by the cam 120.

It will be seen that when the parts of the machine have reached the position approximately as shown in Fig. 3, the center line of the parison molds will be as indicated by the line A—A, that of the carrier as shown by the line B—B, and the centers of the neck molds and finishing molds will be in alignment as shown by the line C—C. Such alignment of the neck molds and parisons with the finishing molds is maintained while the molds are continuously rotating and during the transfer period, by the engagement of the head 39, yoke 136, slight inward and outward radial movement of slide 36 on rods 35 being permitted to this end by the spring 106 and the lost motion connection between the rod 100 loosely mounted in block 103, and the lever 94. However, the action of the yoke 136 in maintaining the neck molds and parisons in vertical alignment with the finishing mold, may be supplemented by the action of cam 92 on lever 94, as will be understood.

The closing of the finishing molds and the opening of the neck molds during the coincident travel thereof in circular paths may be so timed that when the parts of the machine reach dead center positions, as shown in Fig. 2, the finishing molds are completely closed and the neck molds open approximately to the extent shown. However, the timing of the opening of the neck molds and the closing of the finishing molds may be varied as desired, and if preferred, the neck molds may be cracked loosely to support the parisons while the finishing molds are being closed, to guard against injury to the parisons.

The neck molds are completely opened as the parison and finishing mold units move out of radial alignment, such movement eventually causing the separation of the head 39 and the yoke 136. This permits springs 37 and spring 107 to restore alignment of the carrier and the neck molds, with each other and with the parison molds. In the meantime, lever 94 is rocked to retract the neck mold slide 36 which slides into engagement with the outer face of supporting member 34 (or with set screws 34a) thereby aligning the neck molds with the parison molds. The neck molds being closed, the parison molds also are closed by cam 32 after having remained open long enough to permit cooling thereof.

Subsequent to the disengagement of the head 39 and the yoke 136, the blowheads 131 are lowered through the opening in yoke 136, into engagement with the tops of the finishing molds, by the cam 135, and the parisons are blown to final shape therein. When the finishing molds approach the delivery station, the molds are opened by the cam 122, leaving the finished articles supported by the bottom plates, which then are lowered by cam 130, discharging the finished article into a suitable chute or onto a conveyor, not shown.

Various changes may be made in the details of construction and mode of operation of the illustrated embodiment of the invention, without departing from the scope of the appended claims. For example, instead of employing plural molds of ordinary character as shown in the drawings, single or plural molds for making panel bottles or other ware, employing non-circular parisons may be substituted therefor. Moreover, it is to be understood that the invention is not limited to a machine in which the parison molds are supplied with glass by suction, except as expressly stated in the claims, but the parison molds may be charged by gob feeding, or otherwise, as preferred.

The expressions "plural parison molds", "plural neck molds", and "plural finishing molds" are employed for convenience in the specification and claims to denote a plurality of adjoining molds, whether or not they are formed separately but carried by the same holders as shown; or are formed integrally; or are entirely separate molds. It will be seen that the invention is susceptible of use in transferring parisons in a machine wherein the plural molds are arranged side by side, instead of in radial alignment as shown in the drawings.

Having thus described my invention, what I desire to claim and to secure by Letters Patent is:

1. A glassware forming machine, comprising a parison mold table, a parison mold thereon, a neck mold associated with the parison mold, a support for the neck mold, a finishing mold table, a finishing mold thereon, means for continuously rotating said tables, means for shifting the support and neck mold laterally of the parison mold table, and means for rotating said neck mold about a vertical axis relative to said support and parison mold to align a parison supported by the neck mold with the finishing mold.

2. A glassware forming machine, comprising a parison mold table, a parison mold thereon, a neck mold associated with the parison mold, a finishing mold table, a finishing mold thereon, means for continuously rotating said tables, and alternately operable means for angularly moving said neck mold with said parison and finishing molds while held in both radial and vertical alignment with said parison mold and in radial and vertical alignment with said finishing mold respectively, to transfer a parison from the parison mold to the finishing mold, said last-named means including means for preventing relative angular movement between the neck mold and finishing mold while they move together in vertical alignment.

3. A glassware forming machine, comprising a parison mold table, a parison mold thereon, a neck mold associated with the parison mold on said table, a finishing mold table, a finishing mold thereon, means for continuously rotating said tables to rotate the molds about the axes of their respective tables, means for projecting said neck mold radially outwardly of the parison mold table, to align a parison supported thereby vertically with the finishing mold, and means for swinging said neck mold about a vertical axis eccentric to the axis of the parison mold table to align the said parison radially with the finishing mold.

4. A glassware forming machine, comprising a parison mold table, a parison mold thereon, a neck mold associated with the parison mold, a finishing mold table, a finishing mold thereon, means for continuously rotating said tables, means for projecting said neck mold radially outwardly of the parison mold table to align a parison supported thereby vertically with the finishing mold, and stationary means carried by the finishing mold table for swinging said neck mold about a vertical axis to align said parison radially with the finishing mold.

5. A glassware forming machine, comprising a pair of mold tables, a parison mold and an associated neck mold mounted on one table, a finishing mold mounted on the other table, means for moving the neck mold radially of the parison mold table into vertical alignment with the finishing mold, means for causing the neck mold to travel with the finishing mold, and means for preventing relative rotation between the neck and finishing molds during such travel including means for rotating the neck mold relative to the parison mold table, to transfer a parison from the parison mold to the finishing mold.

6. A glassware forming machine, comprising a pair of mold tables, a parison mold and an associated neck mold mounted on one table, a finishing mold mounted on the other table, a slide for supporting said neck mold, means for reciprocating said slide radially of the parison mold table, means for swinging said slide relative to the parison mold table, and means for rotating said neck mold relative to said slide to transfer a parison from the parison mold to the finishing mold.

7. A glassware forming machine, comprising a pair of mold tables, a parison mold and an associated neck mold mounted on one of said tables, a finishing mold mounted on the other of said tables, means for continuously rotating said tables, means for opening the parison mold leaving a parison suspended from the neck mold, means for moving the neck mold and parison out of vertical and radial alignment with the parison mold, and into radial and vertical alignment with the finishing mold, means for causing said neck mold and finishing mold to travel together while in such alignment including means for preventing relative rotation between them, means for closing the finishing mold about the parison suspended from the neck mold, means for opening the neck mold, releasing the parison in the finishing mold, and means for returning the neck mold into radial and vertical alignment with the parison mold.

8. A glassware forming machine, comprising a pair of mold tables, means for supporting said tables for rotation about eccentric axes, plural parison molds and plural neck molds mounted on one of said tables, plural finishing molds mounted on the other of said tables, means for continuously rotating said mold tables, said finishing molds being continuously rotated in closed circular paths, and means for causing the plural neck molds to travel in circular paths in vertical and radial alignment with the finishing molds to transfer parisons from the parison molds to the finishing molds.

9. A glassware forming machine, comprising a pair of mold tables, means for supporting said tables for rotation about eccentric axes, plural parison molds and plural neck molds mounted on one of said tables, plural finishing molds mounted on the other of said tables, means for continuously rotating said tables, and means for rotating said neck molds as a unit about a vertical axis to maintain parisons supported thereby in radial alignment with the finishing molds, to transfer the parisons from the parison molds to the finishing molds.

10. A glassware forming machine, comprising a pair of mold tables, means for supporting said tables for rotation about eccentric axes, plural parison molds and plural neck molds mounted on one of said tables, plural finishing molds mounted on the other of said tables, means for continuously rotating said tables, and means for moving said neck molds out of radial and vertical alignment with the parison molds and into radial and vertical alignment with the finishing molds, and for maintaining such alignment of the neck molds and finishing molds while they are moving, to transfer parisons from the parison molds to the finishing molds.

11. A glassware forming machine, comprising a pair of mold tables, plural parison molds and plural neck molds mounted on one of said tables, plural finishing molds mounted on the other of said tables, means for continuously rotating said tables, means for projecting said neck molds radially outwardly of the parison mold table, for aligning parisons supported thereby vertically with the finishing molds, and means for swinging said neck molds about a vertical axis to align the said parisons radially with the finishing molds.

12. A glassware forming machine, comprising a pair of mold tables, plural parison molds and plural neck molds mounted on one of said tables, plural finishing molds mounted on the other of said tables, means for continuously rotating said tables, means for projecting said neck molds radially outwardly of the parison mold table to align the parisons supported by said neck molds vertically with the finishing mold, and means mounted on the finishing mold table for swinging said neck molds about a vertical axis to align the said parisons radially with the finishing molds.

13. A glassware forming machine, comprising a pair of mold tables mounted for rotation about eccentric axes, plural parison molds and associated neck molds mounted on one of said tables, plural finishing molds mounted on the other of said tables, and means for causing the neck molds to travel in vertical alignment with the finishing molds, including means for moving the neck molds radially of the parison molds into radial and vertical alignment with the plural finishing molds, and means for rotating the neck molds relative to the parison molds to hold the neck molds in radial alignment with the finishing molds during such travel, and to transfer parisons from the moving parison molds to the moving finishing molds.

14. A glassware forming machine, comprising a pair of mold tables, plural parison molds and associated plural neck molds mounted on one table, plural finishing molds mounted on the other table, a slide for carrying said neck molds, means for reciprocating said slide radially of the parison mold table, means for swinging said slide relative to the parison molds, and means for rotating the neck molds as a unit relative to said slide, to transfer parisons from the parison molds to the finishing molds.

15. A glassware forming machine, comprising a pair of eccentric mold tables, plural parison molds and associated plural neck molds mounted on one of said tables, plural finishing molds mounted on the other of said tables, means for continuously rotating said tables, means for opening the parison molds leaving previously formed parisons suspended from the neck molds, and means for causing the neck molds and finishing molds to travel together while in vertical and radial alignment including means for moving said neck molds and parisons out of radial and vertical alignment with the parison molds and into radial and vertical alignment with the finishing molds, means for preventing relative rotation between the neck and finishing molds during such travel, and means for closing the finishing molds about the parisons and for opening the neck molds, releasing the parisons in the finishing molds, while said neck molds and finishing molds are moving in vertical and radial alignment.

16. A glassware forming machine, comprising a pair of mold tables, means for supporting said tables for rotation about eccentric axes, a parison forming unit mounted on one of said tables, plural finishing molds mounted on the other of said tables, said parison forming unit including plural parison molds and associated plural neck molds, means for dipping the parison forming unit into a pool of glass to fill the molds by suction, means for opening the parison molds leaving the previously formed parisons suspended from the neck molds, means for causing the neck molds to move into radial and vertical alignment with the finishing molds and to travel with the finishing molds while in alignment therewith in circular paths, means for closing the finishing molds about the parisons, and means for opening the neck molds releasing the parisons in the finishing molds.

17. A glassware forming machine, comprising a pair of mold tables, means for supporting said tables for rotation about eccentric axes, a parison forming unit mounted on one of said tables, plural finishing molds mounted on the other of said tables, means for continuously rotating said tables to rotate said molds about the axes of their respective tables, said finishing molds being rotated in closed circular paths, said parison forming unit including plural parison molds and associated neck molds, means for dipping the parison forming unit into a pool of glass to charge the molds by suction, means for opening the parison molds leaving previously formed parisons suspended from the neck molds, and means for imparting radial and rotary movements to the neck molds as a unit to transfer the parisons from the parison molds to the finishing molds.

18. A glassware forming machine, comprising a pair of mold tables, plural parison molds and plural neck molds mounted on one of said tables, plural finishing molds mounted on the other of said tables, means for opening the parison molds leaving the previously formed parisons suspended from the neck molds, means for moving the neck molds and suspended parisons radially of the parison mold table, means for swinging the neck molds and parisons relative to the table, and means for imparting rotary movement to the neck molds and parisons as a unit about a vertical axis, to transfer the parisons from the parison molds to the finishing molds.

19. A glassware forming machine, comprising a pair of mold tables, means for supporting said tables for rotation about eccentric axes, plural parison molds and plural neck molds mounted on one of said tables, a suction head associated with the neck molds, said suction head having neck plungers mounted therein, pressure controlled means for actuating said plungers, plural finishing molds mounted on the other of said tables, and means for rotating the neck molds and suction head as a unit about a vertical axis to transfer parisons from the parison molds to the finishing molds.

20. In a machine for forming glassware, the combination of two continuously rotating tables, a blank mold on one table, a finishing mold on the other table, means individual to the blank mold for transferring blanks from the blank mold to the finishing mold, said means comprising a blank holder adapted to support a blank, means for projecting the holder radially of the blank mold table to a position over and in register with a finishing mold, means causing the holder to travel in a horizontal plane relative to the projecting means and thereby follow the path of travel of the finishing mold a predetermined distance, means to close the finishing mold about said blank, and means to then release the blank from said holder.

21. In a glassware forming machine, annular series of blank and finishing molds arranged side by side and rotating continuously about vertical axes, means moving with the blank molds for transferring blanks from said molds to the finishing molds, said means comprising a blank holder, a support for the holder, means providing pivotal and sliding connection between the holder and support, means for projecting the support to carry the holder from a position over and in register with a blank mold to a corresponding position relative to a finishing mold, means for effecting sliding and swinging movement of the holder relative to the support during a predetermined period of time to maintain register of the holder and finishing mold, and means for transferring a blank from the holder to the finishing mold during said swinging and sliding movement of said holder.

22. In a glassware forming machine, annular series of blank and finishing molds arranged side by side and rotating continuously about vertical axes, means moving with the blank molds for transferring blanks from said molds to the finishing molds, said means comprising a blank holder, a support for the holder, means providing pivotal and sliding connection between the holder and support, means for projecting the support to carry the holder from a position over and in register with a blank mold to a corresponding position relative to a finishing mold, yielding means normally retaining the holder against movement relative to the support, cam mechanism for causing sliding and swinging movement of the holder during a predetermined period of travel to cause the latter to move in register with a finishing mold, and means for transferring a blank from the holder to the finishing mold during travel of the holder and finishing mold in register with each other.

23. In a machine for forming glassware, the combination of two continuously rotating tables, a blank mold on one table, a finishing mold on the other table, means traveling with the blank mold table for transferring blanks from the blank mold to the finishing mold, said means comprising a support mounted for movement radially of the blank mold table, a blank holder, means providing pivotal and sliding connection between the holder and support, means for projecting the support to carry the holder from a position in register with a blank mold to a corresponding position relative to a finishing mold, guide means in part associated with the finishing mold table to effect sliding and swinging movement of the holder relative to the support to maintain register of the holder and finishing mold during a predetermined distance of travel, means for closing the finishing mold about the blank, and means for then releasing the blank from said holder.

24. The combination of a continuously rotating blank mold carriage, a blank mold thereon, a continuously rotating finishing mold carriage, a finishing mold thereon, said carriage arranged side by side, a transfer arm mounted on the blank mold carriage, a parison transfer device carried by said arm, means for projecting said arm outward radially of the blank mold carriage for transferring a parison, means for causing the transfer device to travel in the arc of movement of the finishing mold while said arm is projected, and means for causing a movement of the transfer device relative to said arm such that the transfer device is caused to advance at the same speed as the finishing mold during the transfer period.

25. The combination of a continuously rotating blank mold table, a blank mold thereon, a continuously rotating finishing mold table, a finishing mold thereon, said tables arranged side by side, an arm mounted on the blank mold table, a transfer device carried by said arm, means for projecting said arm radially outward and thereby causing the transfer device to carry a parison from the blank mold to the finishing mold, a guide, and operating connections between the guide and the transfer device for moving the latter relative to said arm in a direction transverse thereof and thereby causing the transfer device to advance during a transfer period at the same speed as the finishing mold.

Signed at Hartford, Connecticut, this 4th day of January, 1930.

ROBERT W. CANFIELD.